US008510202B2

(12) United States Patent
Vales

(10) Patent No.: US 8,510,202 B2
(45) Date of Patent: Aug. 13, 2013

(54) COMPUTER SYSTEM FOR EVALUATING FIXED INCOME TRADE OPPORTUNITIES

(75) Inventor: Thomas S. Vales, Dobbs Ferry, NY (US)

(73) Assignee: The Municenter, New York, NY (US)

( * ) Notice: Subject to any disclaimer, the term of this patent is extended or adjusted under 35 U.S.C. 154(b) by 2242 days.

(21) Appl. No.: 11/045,937

(22) Filed: Jan. 28, 2005

(65) Prior Publication Data

US 2006/0173769 A1 Aug. 3, 2006

(51) Int. Cl.
*G06Q 40/00* (2012.01)
(52) U.S. Cl.
USPC .................................. 705/37; 705/38; 705/35
(58) Field of Classification Search
USPC ...................................................... 705/35–40
See application file for complete search history.

(56) References Cited

U.S. PATENT DOCUMENTS

| | | | | |
|---|---|---|---|---|
| 6,161,099 | A | 12/2000 | Harrington et al. | 705/37 |
| 6,446,047 | B1 * | 9/2002 | Brier et al. | 705/35 |
| 6,871,189 | B2 * | 3/2005 | Brier et al. | 705/35 |
| 6,876,309 | B1 | 4/2005 | Lawrence | |
| 7,155,408 | B2 * | 12/2006 | Hebbar et al. | 705/35 |
| 7,249,077 | B2 * | 7/2007 | Williams et al. | 705/35 |
| 7,499,883 | B2 * | 3/2009 | Goldenberg et al. | 705/37 |
| 7,526,443 | B2 | 4/2009 | Agarwal | |
| 7,966,251 | B2 * | 6/2011 | Whang | 705/38 |
| 8,165,937 | B1 * | 4/2012 | Hebbar et al. | 705/35 |
| 2002/0111896 | A1 * | 8/2002 | Ben-Levy et al. | 705/37 |
| 2002/0156719 | A1 * | 10/2002 | Finebaum et al. | 705/37 |
| 2002/0184142 | A1 * | 12/2002 | Whang | 705/38 |
| 2003/0204464 | A1 * | 10/2003 | Hebbar et al. | 705/36 |
| 2004/0153394 | A1 * | 8/2004 | West et al. | 705/37 |
| 2006/0271459 | A1 * | 11/2006 | Lange | 705/35 |

OTHER PUBLICATIONS

Romano et al: "Price transparency in the municipal marketplace", ABA Trust & Investments. Washington, Nov./Dec. 2002, vol. 90 p. 5, 2 pgs.*
Ali, Paul U.: "Credit Derivatives and Synthetic Securitizations: Innovation and Fragility", Banking & Finance Law Review 20. 3 (2004/2005): 293-317—19 pages.*
MSRB RTRS Price Dissemination Services, Aug. 25, 2004, Version 2.0.
MSRB RTRS Price Dissemination Services Errata Sheet, Nov. 5, 2004.
RTRS Subscriber Connectivity, Sep. 2, 2004, Random Walk Computing, Inc., New York, NY, Version 1.0.
Internet web page entitled "HTDOnline Home Page", www.htdonline.com, and example web pages cited therein.

* cited by examiner

*Primary Examiner* — Eric T Wong
*Assistant Examiner* — Ed Baird
(74) *Attorney, Agent, or Firm* — King & Spalding LLP

(57) ABSTRACT

Systems and methods embodying the present invention permit a trader of securities such as municipal bonds to observe real-time data relating to actual or prospective trades of relevance to a contemplated trade, while excluding those actual or prospective trades that are insufficiently relevant. The trader, or other user, can specify filtering criteria according to which actual or prospective trade data will be collected and presented. The retrieval and presentation of matching data permits an informed yet rapid determination of a price, or other information, for a particular municipal bond or analogous security.

19 Claims, 8 Drawing Sheets

COMPUTER SYSTEM FOR EVALUATING FIXED INCOME TRADE OPPORTUNITIES

FIELD OF THE INVENTION

The present invention pertains generally to computer systems and methods for supporting securities transactions and, more specifically, to systems and methods for use trading municipal bonds or other fixed income securities.

BACKGROUND

The nature of the municipal bond market is unlike the markets for other types of securities. Central exchanges for trading fixed income securities do not typically list municipal bonds. Market participants seeking to determine a price for buying or selling a particular bond must resort to indirect approaches that can be time consuming and imprecise. As a result, municipal bond trading, in its present form, involves substantial transaction costs as well as the risk of either overpaying for a bond or of selling a bond for less than its actual worth.

The difficulty of determining a price for a municipal bond in a decentralized market and its associated transaction costs are compounded by several other factors unique to the municipal bond market. At present, approximately 1.6 million municipal; bonds representing over two trillion dollars of debt are owed by large and small municipalities spread throughout all fifty of the United States. The bonds may be issued for general purposes, such as education or economic development, or for more specific purposes such as the building of a new school, the maintenance of a water shed, or the purchase of snow removal equipment. The bonds may have long (e.g., 30 year), short (e.g., 1 year), or intermediate maturity periods. The municipalities issuing the bonds may have credit ratings ranging from the highest quality rating (triple A) down to securities of the lowest, unrated quality. Further, municipal bonds are often purchased by "buy and hold" investors interested not only in the potential for beneficial state tax treatment of income they generate, since many municipal bonds are exempt from state taxes in their state of issue, but also in the predictability of that income. The buy and hold approach is sufficiently prevalent that roughly 80% of the trades involving a specific municipal bond are made within only three months of the bond's issuance.

Due to the vast numbers of municipal bonds and the difficulty in determining their price, firms involved in trading municipal bonds generally rely upon groups of specific individuals to conduct their trades, each having expertise and conducting trades in only a narrow category of municipal bonds. As a consequence, firms generally define trading responsibilities by region and maturity.

When an investor wishes to sell a municipal bond, other market participants will value that security. A trader in whose sector the security for sale happens to fall is responsible for determining a value for the bond. If the trader is familiar with the bond, he may be able to estimate subjectively what it is worth. If the trader is not familiar with the bond, he or she will try to discover its price. Yet, the challenges confronting price discovery are significant and time may be of the essence. Interest rates constantly change and opportunities to buy and sell may be lost due to market moves. In short, the determination of a municipal bond's price using conventional approaches is generally a time consuming process requiring investigation of numerous sources to determine a price.

In particular, to discover a price of a municipal bond, a trader will often confer or check with broker's brokers, internal trade blotters, street offerings, and price history data made available by the Municipal Securities Rule Making Board (MSRB). Ideally, the trader would like to know where identical bonds have traded in the past to make a decision about the future, necessitating a search of MSRB data, which includes information relating to approximately 30,000 trades per day, or approximately 55 per minute during nine hours of trading. That data is not available if the bond has not been traded previously, relegating the trader to the task of identifying, somehow, how similar types of securities may have been traded. At present, MSRB trade data includes the following:

MSRB Trade Data:
Message Type (message_type)
Sequential Number (seq_nbr)
RTRS Control Number (rtrs_cntl_nbr)
Trade Type Indicator (trade_type)
Transaction Type Indicator (trans_type_ind)
CUSIP (cusip)
Security Description (description)
Dated Date (dated_date)
Coupon (if available) (coupon)
Maturity Date (maturity_date)
When-Issued Indicator (when_issued_ind)
Assumed Settlement Date (if applicable) (assumed_settlement_date)
Trade Date (trade_date)
Time of Trade (trade_time)
Settlement Date (if known) (settlement_date)
Par Traded (par_traded)
Dollar Price (price)
Yield (yield)
Broker's Broker Indicator (brokers_broker_ind)
Weighted Price Indicator (if available) (weighted_price_ind)
Syndicate Price Indicator (if applicable) (syndicate price_ind)
RTRS Broadcast Date (rtrs_publish_date)
RTRS Broadcast Time (rtrs_publish_time)
Version Number (version_nbr)

Alternative trading systems (ATS's) have diminished the burden on market professionals of conducting price discovery by providing a marketplace where a plurality of individual market participants can sell and purchase bonds. Search engines have assisted traders with sifting through the vast amounts of offering data. Hampering the trader in this effort is the fact that a search must begin with a "CUSIP" for a particular security. A unique nine-digit number assigned to each security, a CUSIP is generated under the procedures of The Committee on Uniform Security Identification Procedures, an organization established under the auspices of the American Bankers Association for the purpose of developing a uniform method of identifying securities. Entry of a CUSIP would permit the retrieval of information on the circumstances of the respective security's most recent trade. ATS's typically run static pages of the offerings they have collected throughout the day, which can quickly become stale and may fail to reflect changes in the market or the movement of interest rates.

The MSRB has announced that it will publish real-time information relating to Municipal Bond trades to subscribers over the Internet or other network. (See, e.g., MSRB RTRS Price Dissemination Services, Aug. 25, 2004, Version 2.0, MSRB RTRS Price Dissemination Services Errata Sheet, Nov. 5, 2004, and RTRS Subscriber Connectivity Version 1.0, by Random Walk Computing, Inc., Sep. 2, 2004, the contents of which documents are incorporated by reference herein in their entirety). While the MSRB real-time trade feed will make trade information available with little or no delay, traders may nevertheless be overwhelmed by the data, seeing 30,000 or more trades scroll by each day, and will still need to enter searches with a CUSIP.

Accordingly, the present invention has recognized a need to provide traders of municipal bonds and other fixed income securities with a more efficient, accurate, and timely method to price bonds and to better identify prospective trades that match the trader's needs.

SUMMARY OF THE INVENTION

Embodiments of the systems and methods according to the present invention address the previously unmet need for a more efficient, accurate, and timely method to observe the nature of actual or prospective transactions involving securities similar to a security a trader wishes to transact, to formulate a price for the security, to add to positions, execute at market levels or sell bonds at similar levels, or otherwise to identify prospective trades that match a the needs of a municipal bond or other fixed income security trader, quickly and efficiently. In practicing one embodiment of the present invention, the user may establish a filter corresponding to one or more search criteria, load a user interface to view output associated with the filter. The user interface presents the output data, which may be displayed in scrolling fashion, since the number of MSRB trades is likely to be significant. When a CUSIP that has traded matches a corresponding CUSIP in an offer, bids or bids wanted table, the user interface will display the trade followed by the matched positions. The matched positions, in one embodiment, will contain a hyperlink enabling the user to "click" on the position to execute a trade or receive further available information. Firms may also utilize their own proprietary trade information in conjunction with the MSRB data, but incorporate the trades in a timely manner, as opposed to waiting for the trade data to be disseminated The invention, as implemented in the described embodiments, provides, among other things, a computer-implemented system and method for receiving both external and internal trade information such as price, yield, CUSIP, trade date, trade time, and settlement date. Computer-implemented systems and methods according to the present invention also include a filter system and method to screen and exclude information that is not relevant to a trader's needs and to associate existing trade opportunities with real-time trading events. Additionally, embodiments of computer-implemented systems and methods according the present invention provide the notification of individual traders via a customized rolling list of relevant trading events along with related information including offers, bids, and bids wanted. Further, computer-implemented systems and methods according to the present invention allow individual traders to customize the information they receive. Although developed with municipal bonds in mind, the systems and methods according to the present invention also can be used to assist traders with respect to other markets involving securities or properties, such as those that are heterogeneous and not otherwise traded on a central exchange.

An embodiment of a computer system implemented method for identifying and distributing municipal bond trading-related information, according to the present invention, includes the computer system in communication with at least one user, and comprises the following steps. The computer system receives a notification of a municipal bond trading event, generates, using the computer system, a characterization of the event, the generation being performed at least in part on the basis of the notification, the characterization having at least one characteristic associated with the trading event. In addition, the computer system identifies the user from among a set of users, information regarding which users resides on a computer storage medium accessible to the computing device. The computer system accesses a filtering criterion associated with the identified user and checks whether the bond characterization satisfies the accessed filtering criterion. If so, the computer system transmits to the user a message containing at least a subset of the notification. The transmitted information can be used in formulating a price for a municipal bond, characteristics of which formed the basis for selection of the criterion.

In another embodiment according to the present invention, an information storage medium for use in association with a computer system for distributing municipal bond trading information, has structure including a real-time characterization of the sale of a municipal bond and a plurality of additional characterizations of events relating to bonds that differ from the municipal bond and that are selected according to a preselected criterion of similarity with respect to the municipal bond.

In another embodiment, a computer-implemented real-time event filtering method for observation and identification of municipal bond trade event data for a user in communication with the computer includes the following steps. At least one user-configured criterion on the nature of a municipal bond involved in a trading event is invoked in the computer. Each of a plurality of real-time event data relating to municipal bond trading events are tested as to whether they satisfy the criterion. If at least one of the plurality of real-time event data satisfies the criterion, information relating to the at least one real-time event is transmitted to the user.

Another embodiment of the present invention involves a computer-implemented method for identifying and retrieving trade-related data for use in trading fixed income securities. The method includes the steps of receiving at the computer a user specification of a filter for identifying securities having a preselected degree of similarity to a target fixed income security, receiving data relating to trade events, including offers and bids for a plurality of fixed income securities, applying the filter to data relating to trade events, and transmitting, to the user, data identified by the filter, thereby equipping the user to select a price for a target fixed income security.

In yet another embodiment, a computer-implemented system for assisting in the trading of municipal bonds includes a central processor unit for receiving event data relating to at least one of the group consisting of municipal bond offers, bids, bids wanted and trades, a filter subsystem in communication with the central processor unit for defining a filter including characteristics of events to be identified, and an event subsystem in communication with the central processor unit for applying the filter to identify events having the characteristics. The identified events having the characteristics can be made available for use in the trading of municipal bonds.

In a further embodiment, a computer-implemented method for collecting data for use in determining a price for a municipal bond includes the following method steps, where a user computer is in communication over a network with a server. The user computer receives from a user at least one user-configured criterion for identification of a municipal bond involved in a trading event, transmits the user-configured criterion over the network to the server, and receives over the network information relating to a trading event and satisfying the criterion, whereby the user may determine a price for the municipal bond at least in part on the basis of the received information.

In yet another embodiment, a computer-implemented method for identifying and retrieving trade-related data for use in trading fixed income securities includes the steps of eliciting from the user a user specification of a filter for identifying securities having a preselected degree of similarity to a target fixed income security, transmitting the user specification to a server that receives data relating to trade events, including offers and bids, for a plurality of fixed income securities, that applies the filter to data relating to trade events, and that captures data relating to trade events using the user-specified filter; receiving data identified by the filter; displaying to the user, data identified by the filter, thereby equipping the user to select a price for a target fixed income security.

BRIEF DESCRIPTION OF THE DRAWINGS

FIG. 2 shows a filter template in an embodiment of an aspect of the present invention.

FIG. 7 is a flow diagram depicting a process performed by the described embodiment.

DETAILED DESCRIPTION

According to one aspect of the present invention, traders of municipal bonds are provided with live and reliable market content in the form of computer-generated and network-delivered detail on trades as they occur and as they are reported by the MSRB, as well as relevant content about bonds that are available in the market, automatically filtered for the individual user to ensure their relevance to that user's needs. As described below, traders or other users access a combination of live content: i.e., trades, bids wanted, and offerings. The user can customize the user interface such that it shows only market data that conform to the user's predetermined criteria. Only offerings and bids wanted that fit the search criteria are presented to the user. Also, every relevant trade in the market appears, as it is reported by the MSRB, followed by any offerings and bids wanted for the matching CUSIP. In an embodiment of one aspect of the present invention, the user can take a specific CUSIP and to check to see if it fits specific search criteria, as the process involves checking every security indicative and evaluating whether or not it fits pre-determined search parameters. The user is thereby accorded the ability to search for live market content (i.e., offerings, bids wanted, and all trades) with that content filtered to ensure relevance to that user's needs.

Figure 1A:
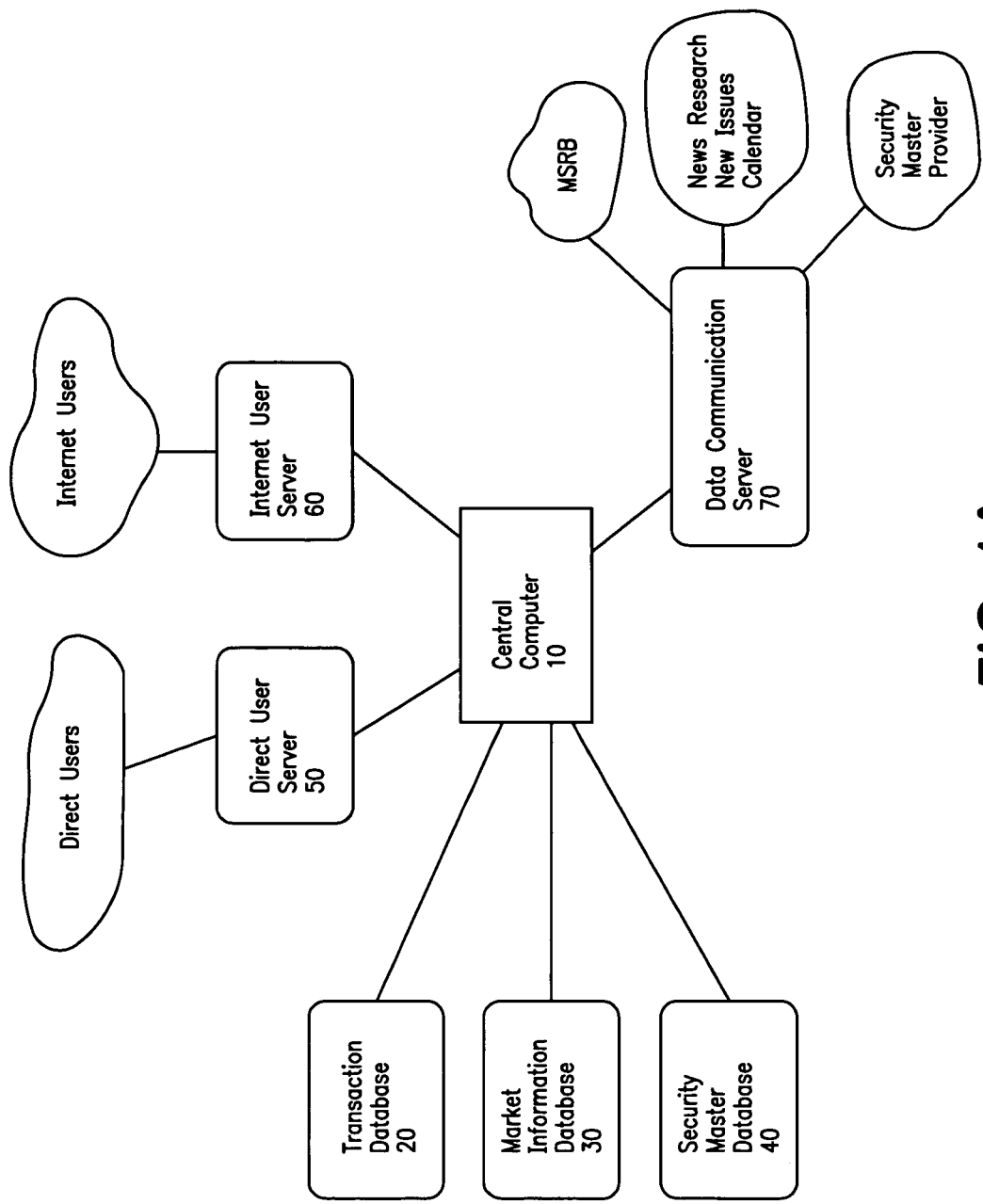
FIG. 1A shows a block diagram depicting aspects of a central computer system in an embodiment of the present invention.

An embodiment of a system according to the present invention is shown in FIG. 1A. A municipal bond trading system involves central computer system 10, transaction database 20, market information database 30, security master database 40, direct user server 50, internet user server 60, and data communication server 70.

In one embodiment of the system shown in FIG. 1A, hardware and software are as follows: central computer 10 comprises one or more Fujitsu PrimePower 250 and/2or 650 computers running WebLogic 8.1 and Perl 5.x; transaction database 20 comprises one or more Fujitsu PrimePower 650 computers, with RAID 5 disk storage, and running Sybase 12.5 and Perl 5.x; market information database 30 comprises one or more Fujitsu PrimePower 650 and/or 250 computers, with RAID 5 disk storage, running Sybase 12.5 and Perl 5.x; security master database 40 comprises one or more Fujitsu PrimePower 650 computers, with RAID 5 disk storage, running Sybase 12.5 and Perl 5.x; direct user server 50 comprises one or more Sun Enterprise 420R computers, running Java 1.42_05, Tibco, IBM MQ and Perl 5.x; internet use server 60 comprises one or more Sun Enterprise 420R computers running WebLogic 8.1 and Perl 5.x; and data communication server 70 comprises one or more Sun Enterprise 220R computers running Java 1.42_05, Tibco, IBM MQ and Perl 5.x; all systems are networked using Cisco Systems Catalyst 6500.

Direct user server 50 is accessed by direct users and establishes communication between them and central computer 10, while internet user server 60 provides internet user communication with central computer 10. Data communication server 70 receives feeds from MSRB (according, for example, to RTRS Subscriber Connectivity Version 1.0, referred to above), as well as news research, information regarding new issues and calendar information, from other data and news providers, according to methods understood by those skilled in the art. Still further, data communication server 70 receives data from a security master provider. Embodiments incorporating other architectures, hardware and software arrangements for carrying out the described functions are also within the scope of the present invention.

Figure 1B:
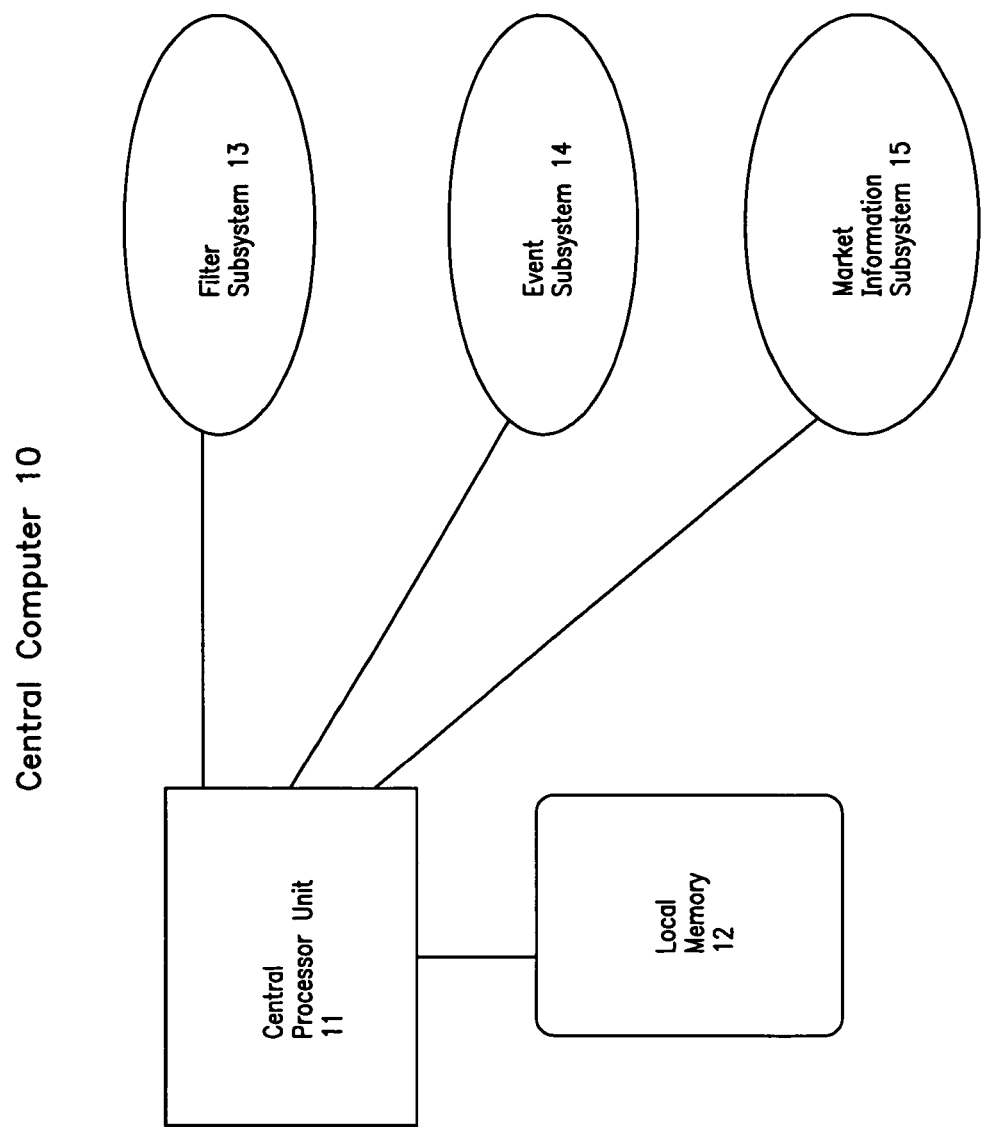
FIG. 1 is a diagram of a system embodying aspects of the present invention showing connections between system components and sources of data.

As shown in FIG. 1B, in one embodiment of an aspect of the present invention, central computer system 10 comprises central processor unit 11, local memory 12, filter subsystem 13, event subsystem 14, and market information subsystem 15. In the illustrated embodiment, although without limitation, filter subsystem 13, event subsystem 14, and market information subsystem 15 are implemented by software running on server 10. The functionality associated with these subsystems could be distributed over more than one computer or processor. For example, filter subsystem 13 could be implemented in a user's computer system (not shown).

Filter subsystem 13 enables individual traders or other users to configure the various filters that are used for the event processing described below. Again, in accordance with an aspect of the present invention, the user configures a filter in order to identify trade or offering data for securities (also referred to herein as "trading event" data, whether or not an actual trade has been completed) indicative of the price of a security he or she wishes to buy or sell. "Indicative," as used here in an adjectival sense denotes a tendency to provide a basis on which the user can draw inferences of relevance to the price of a security. In another sense, when used as a noun, the term refers to data associated with and characterizing a security.

Figure 2:
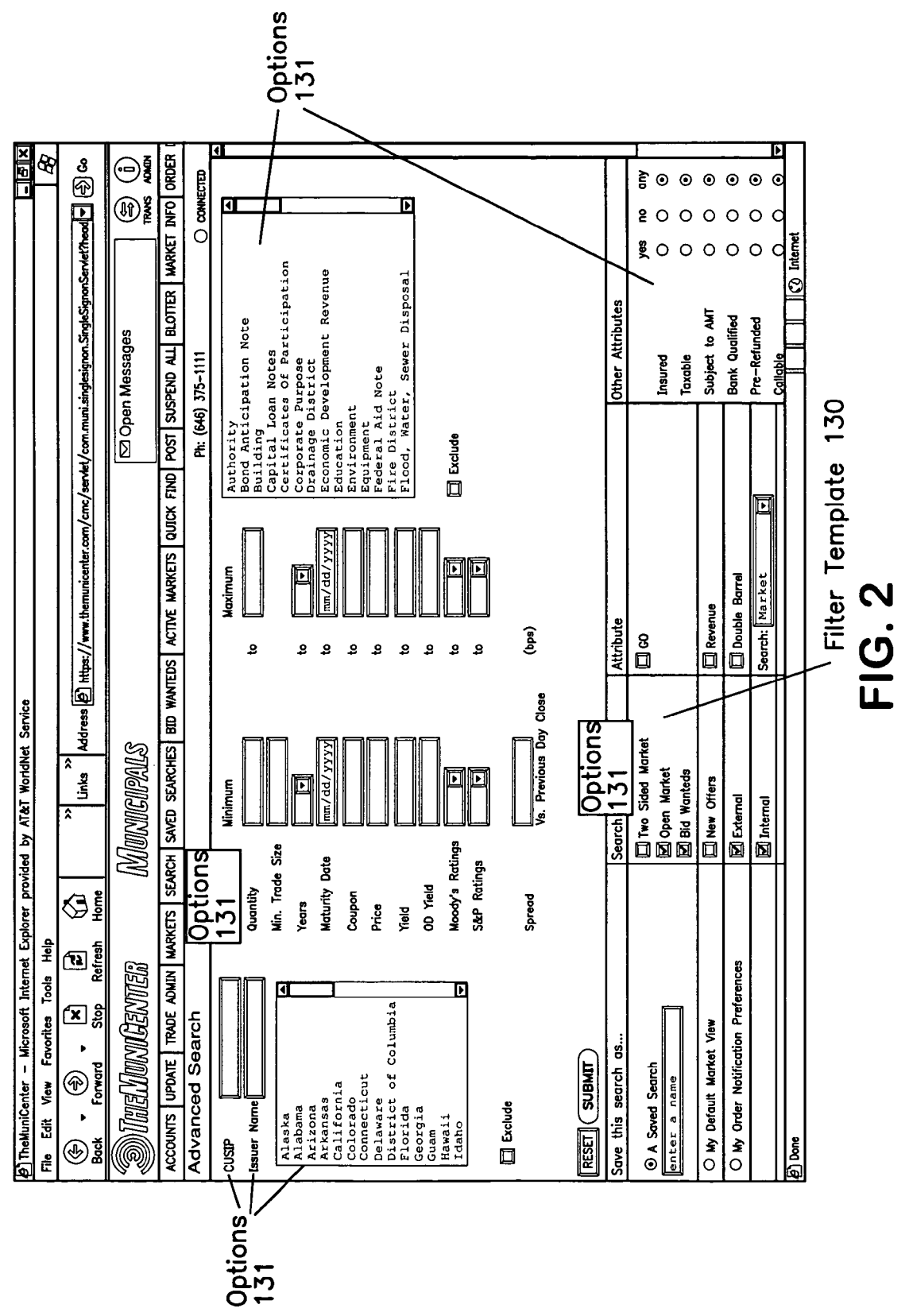

FIG. 2 depicts an embodiment of a filter template 130, according to an aspect of the present invention, that is provided to a user equipped with suitable computing equipment in direct or indirect communication with direct user server 50 or internet user server 60 and that is depicted on an internet browser. The user can designate or preselect one or more filtering criteria by selecting among options 131 provided on a filter template 130. The options 131 represent municipal bond "indicatives" or characteristics such as the state of issue, the bond purpose, the quantity, the price, and the yield, which can be selected and configured by a user.

In one embodiment, the indicative data can include without limitation any one or combination of the following:

Indicative Data:
cusip
coupon_ratefirst_coupon
payment_ref_date
coupon_class
day_count
description
issue_date
maturity_date
when_issued
industry_code
callable
next_par_call_date
next_par_call_price
next_premium_call_date
next_premium_call_price
next_put_call_date
next_put_call_price
next_sinking_fund_date
next_sinking_fund_price
bank_qualifiedamt
prerefund_date
prerefund_price
taxablemunicipal_type
insurance_flag
interest_pay_frequency
etm
original_settle
dated_date
insurance
original_issue_yield
original_issue_price
original_principal
state
sp_ratingmoody_rating
fitch_rating
concensus_index
fc_accrual_date
security_type
sinking_fund
special_call_indicator
institution_type
lastupd which are known to those skilled in the art.

Figure 3:
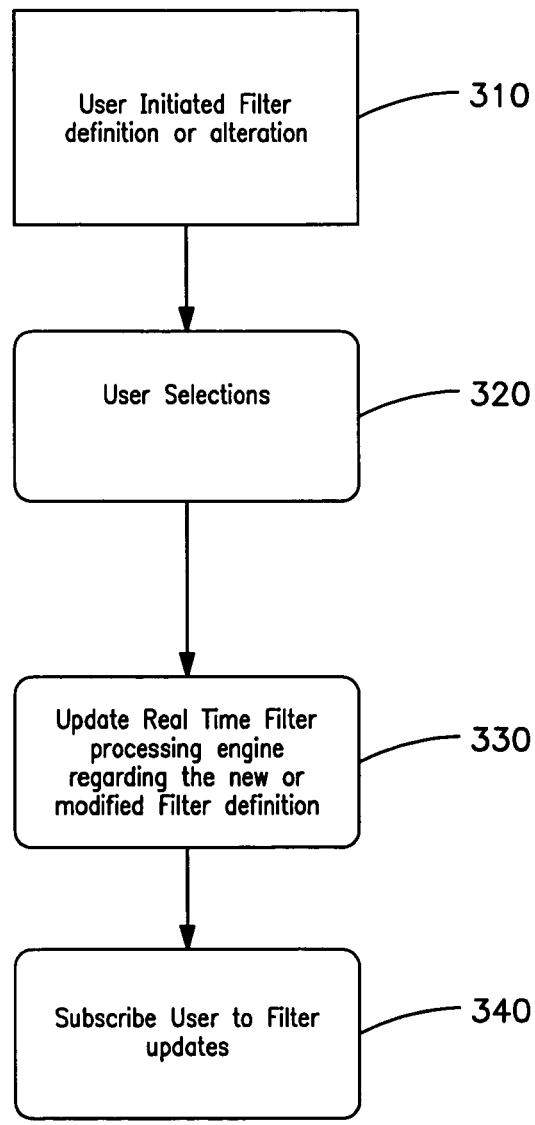
FIG. 3 shows a user interface provided to a user in an embodiment of an aspect of the present invention.

The indicative information can be accessed as part of security master file commercially available from Standard & Poors J.J. Kenny, FT Interactive Data, Thomson and perhaps others. The selection and configuration may be accomplished in a plurality of ways including selecting options from a list, filling in values for a range, or making a binary selection. Filter subsystem 13 uses the selected and configured filtering criteria to generate a filter, which is associated with a specific user and stored in memory 11. A flow chart depicting the creation or modification of a filter, in an embodiment of this aspect of the present invention, is shown in FIG. 3. At step 310, a user-initiated filter is invoked for filter definition or alteration which, at 320, is set according to user selections. A data structure representing the filter, including its definition, possibly including alterations, is stored by central processor unit 11 in local memory 12, or in an otherwise suitable storage medium.

Event subsystem 14 monitors the information being received from direct user server 50, internet user server 60, and data communication server 70 for the occurrence of an event. Event subsystem 14 processes each event for each user by applying the filters generated by the users and by filter subsystem 13. Additionally, event subsystem 14 provides information related to the events to users via direct user server 50 and internet user server 60.

Figure 4:
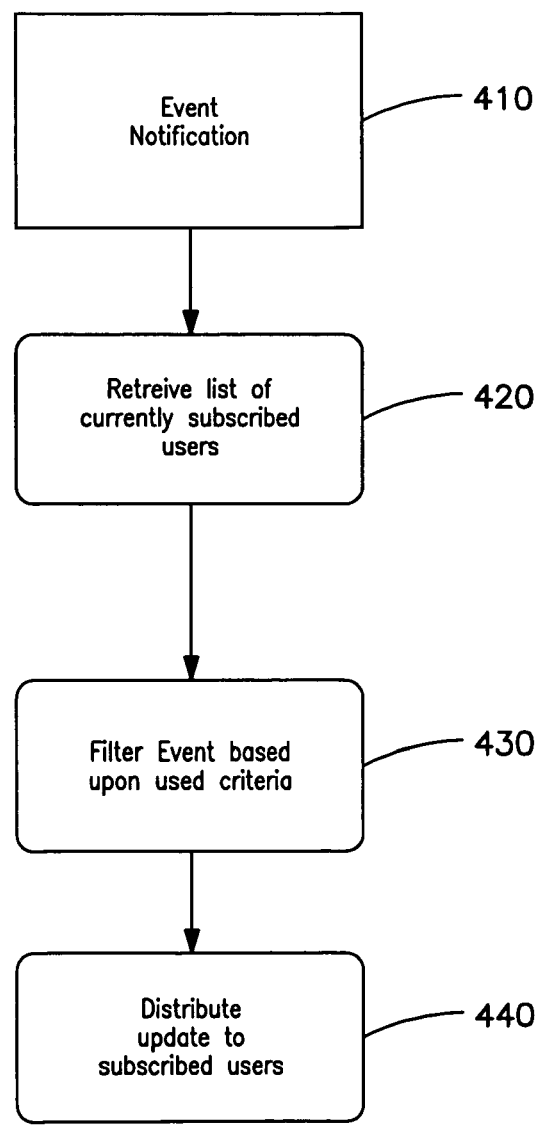
FIG. 4 shows a flow diagram depicting an embodiment of a process associated with event subsystem 14 according to an aspect of the present invention.

Functioning of a system according to the illustrated embodiment is described below, with reference to flow charts that are shown in the appended figures. FIG. 4 is a flow chart depicting an embodiment of basic processing of a user event. User events include offers for sale, bids, and bids wanted that are posted on the system by its users, which may include aggregators such as alternative trading systems, exchanges, and broker's brokers as well as individual bond holders such as broker dealers, mutual funds, and insurance companies. Event subsystem 14 receives notice of an event at step 410, where the notice includes an identification of an event type (e.g. a sale) as well as certain bond characteristics including at least the bond's CUSIP as well as other pertinent information such as quantity and price. Additional bond characteristics such as yield, S&P rating, bond purpose, tax exempt status, etc. may be looked up from market information database 30. A list of currently subscribed users is retrieved at step 420. For each user, at step 430 event subsystem 14 applies the user's event filter to the bond characteristics. If the bond's characteristics meet the requirements of the user's event filter, then at step 440 notice of the event is provided to subscribed users whose criteria are matched by the event.

Figure 5:
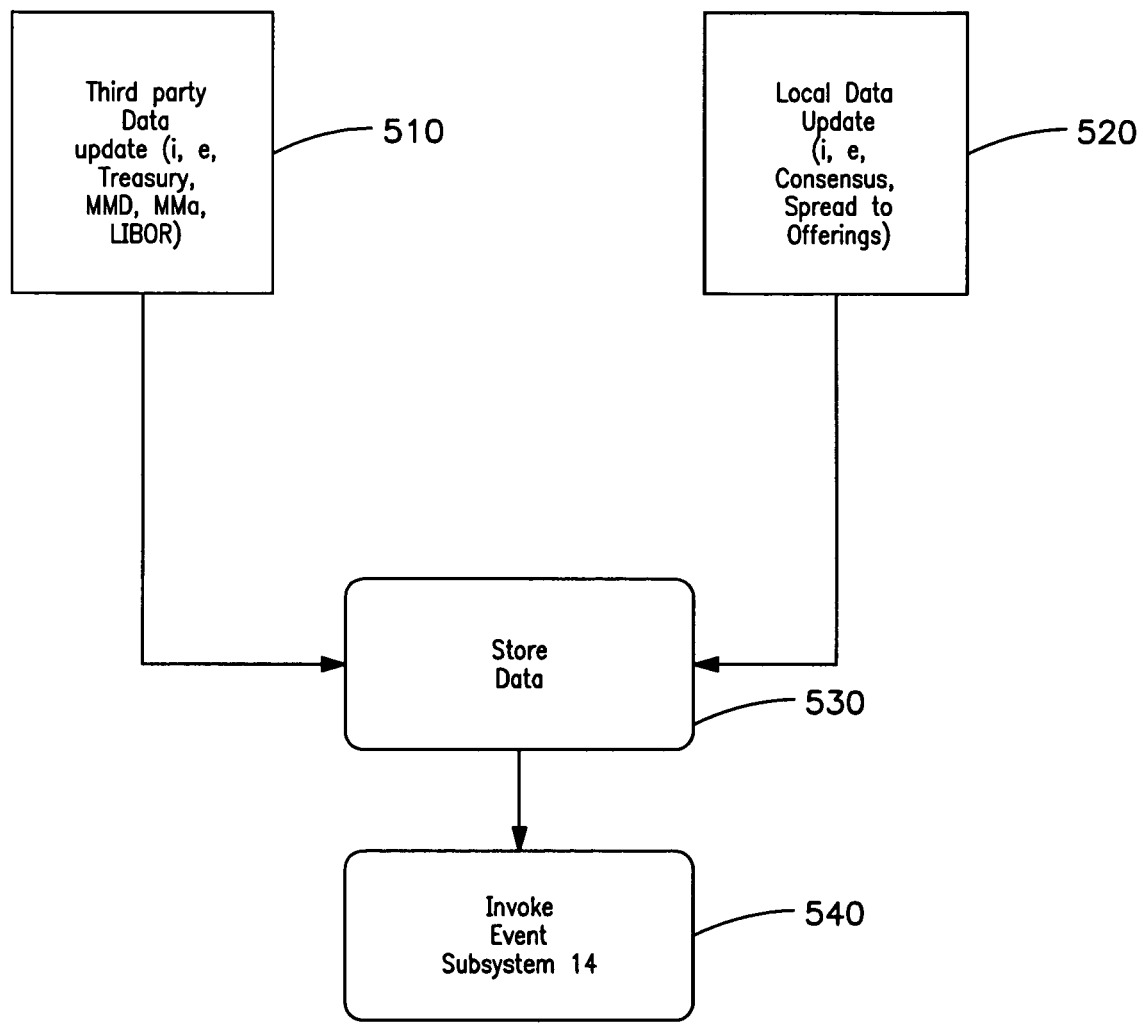
FIG. 5 shows a flow diagram depicting an embodiment of a process associated with market information subsystem 15 according to an aspect of the present invention.

FIG. 5 illustrates the operation of an embodiment of market information subsystem 15. Market information subsystem 15 receives market related data from a variety of source including, at step 510, third party data (i.e., Treasury MMD, MMa, LIBOR) and, at step 520, local data (i.e., consensus, spread to offerings). At step 530, market information subsystem 15 stores the information in market information database 30. Market information subsystem 15 monitors the information and identifies any relevant events such as events that may affect the characteristics of a municipal bonds. Additionally, market information subsystem 15 processes internal and external data and generates events based upon the analysis. Notice of the events is provided by market information subsystem 15 to event subsystem 14 at step 540. Event subsystem 14 determines which users should be notified of the events and whether information pertaining to prior events (e.g., previously listed offers or bids) should be included with the notice. Market information subsystem 15 also provides a means for users to acquire detailed market information or news by clicking on links provided on web pages that are accessible to the users through direct user server 50 and internet user server 60.

Figure 6:
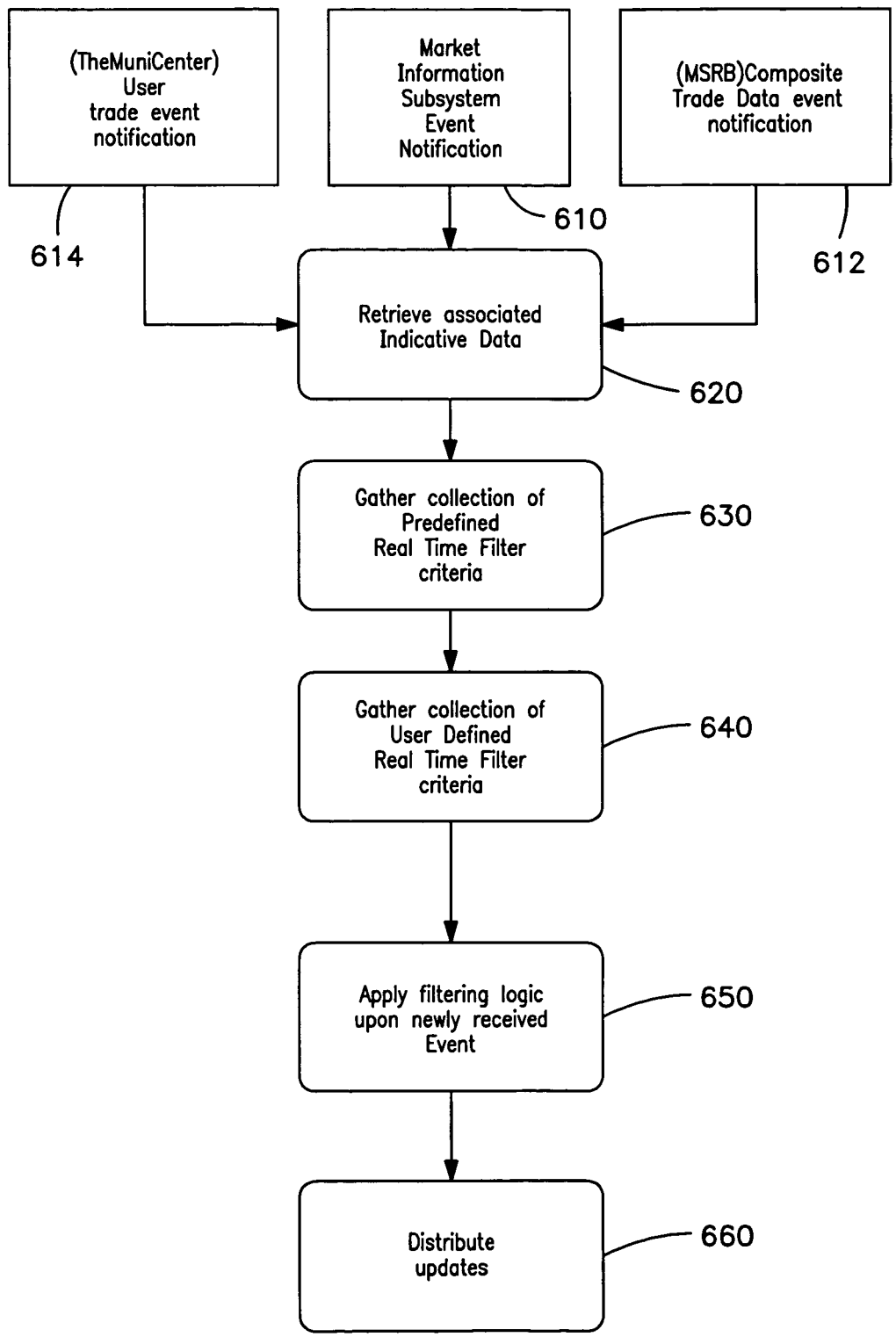
FIG. 6 shows a flow diagram depicting a further embodiment of a process associated with event subsystem 14, with additional detail relative to the flow diagram of FIG. 4, according to an aspect of the present invention.

FIG. 6 depicts the operation of event subsystem 14 in an embodiment of an aspect of the present invention. Event subsystem 14, at 610, is invoked by market information subsystem 15. In addition, it may receive, per 612, a real-time feed from the MSRB, via communication server 70, that a bond has, for example, been traded. Still further, the organization's own proprietary trade information (here depicted as The MuniCenter, assignee of the present invention) may enter event subsystem 14 as a trade event notification, at 614. At step 620, event subsystem 14 retrieves indicative data from the received information, which may include without limitation such bond characteristics, such as the CUSIP, quantity, trade price, trade date and time, and settlement date. Characteristics of a bond may derive from security master database 40 (from Standard & Poor's J.J. Kenny, FT Interactive Data or other provider) by reference to the CUSIP and be combined with the characteristics contained in the notice and with the transaction type to create a transaction characterization. Event subsystem 14 may gather, at 620, one or more predefined filter criteria for use against the real time data. In addition, or alternatively, event subsystem 14 may gather (e.g., via direct user server 50 or internet user server 60) one or more user defined real time filter criteria. Either criteria may be provided in the form of a filter generated by filter subsystem 13. Transaction database 30 is then searched, at 650, applying filtering logic using a predefined, user defined or combined filters upon an event received as described above, in order to identify prior events (e.g., offers for sale, bids, and bids wanted) that are still active and that involve bonds having a desired degree of similarity. The transaction characterization is then compared to the user's filter for MSRB sales data. If the transaction characterization meets the requirements of the filter, then the transaction characterization as well as the transaction characterizations for each of the identified prior events is provided to the user. The process shown in FIG. 6 can be performed on user events or system-generated events.

Figure 7:
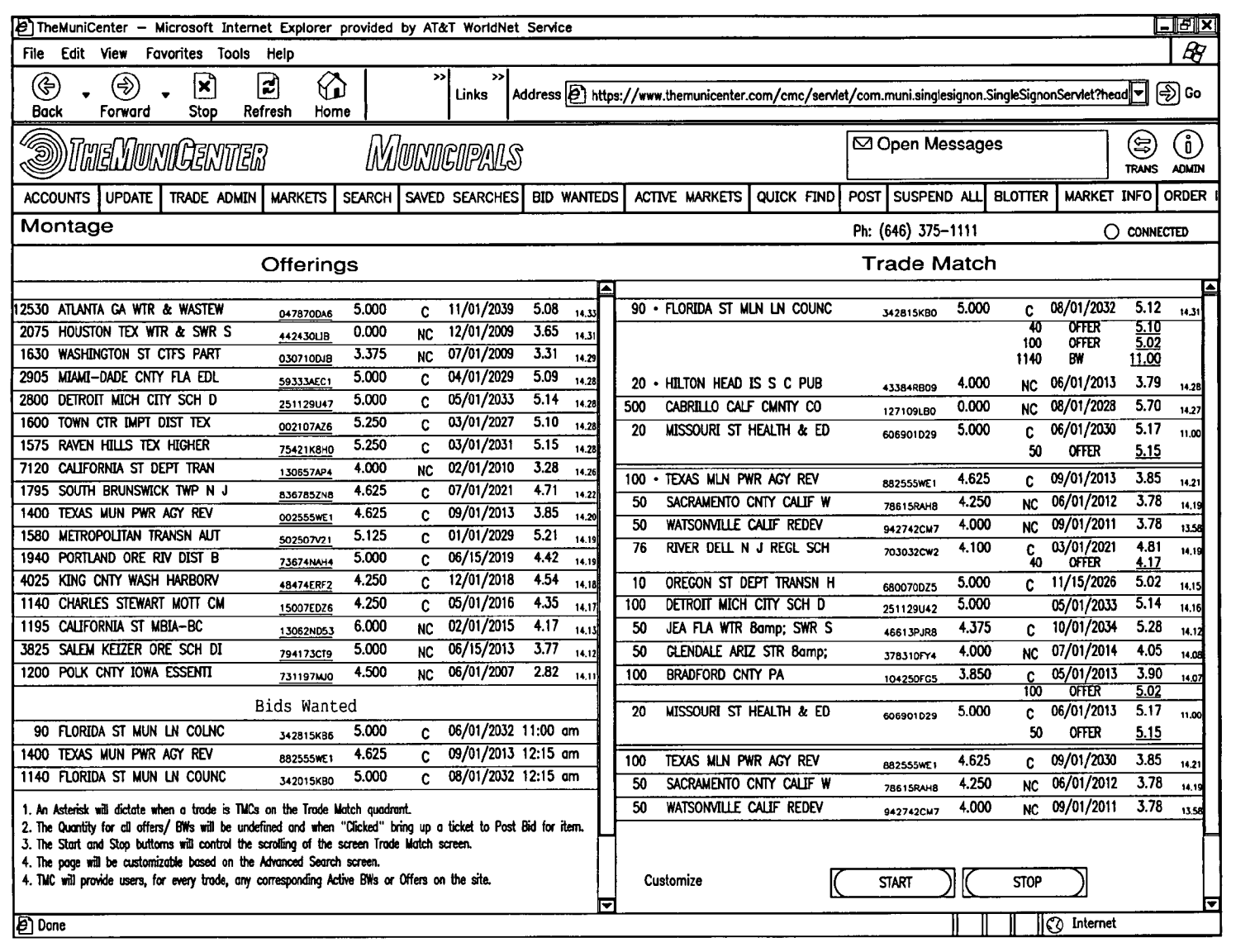

The transaction characterizations of the MSRB sale event and of the identified prior events are displayed on a user interface (e.g., without limitation an internet web page) of the type shown in FIG. 7. The user can obtain additional information about a bond, execute the purchase of a bond, execute the sale of a bond, or provide a bid by making selections on the web page. The information provided on the web page will scroll as transaction characterizations associated with more recent events are provided to the user.

The MSRB provides pricing data on approximately 30,000 trades per day. As of January 2005, this data will be provided to MSRB subscribers in real-time. Accordingly, approximately one trade will be provided from the MSRB to the municipal bond trading system every second. This will allow the municipal bond industry the opportunity to know the volume and the velocity of the market. The municipal bond trading system of the present invention will be able to instantly provide users with all of the bids, offers, and bids wanted that correspond to each sale reported by the MSRB. For an individual trader, this would be too much information to process. However, the user-customizable filtering system and method according to the present invention not only permits users to receive all of the information that is relevant to them, but also enables users to receive only the information that is relevant to the transaction they are contemplating. This information empowers users to add to positions, execute at market levels, or sell municipal bonds (or other securities requiring the processing provided for by the present invention) at similar levels quickly and efficiently. A trader will be relieved of the former need to devote time to calling and searching for matches; the system and method according to the present invention provide the desired result automatically and in real-time. Additionally, users will be able to transact at speeds much greater than traditional market participants and thereby gain a competitive advantage.

Most municipal bond traders are specialists by region or maturity range. The municipal bond trading system of the present invention enables traders to generate a customized real-time view of only the areas of the municipal bond market they are specialists in or to easily expand there areas of specialty. By generating customized filters through the use of filter subsystem 13 and filter templates 130, a user can define exactly the type of securities he or she would like to be shown in their personalized view. The customized filters according to an aspect of the present invention eliminate the majority of the overwhelmingly vast number of transaction events that occur and only provide individual users with the events involving securities that are of interest to the specific user. Individual users are able to tailor the security characteristics that are important for that specific user's needs and preferences. For example, municipal bond traders may select a specific state and a specific maturity range.

Once a user has configured filters using the user's customized search criteria, the user loads a trade event viewing screen (e.g. a web page) on her browser to view the output of the user defined filter. The screen presents the filtered events in a scrolling fashion. When the characteristics of a municipal bond whose trade has been reported match the characteristics of existing offers, bids, or bids wanted, the screen will display the trade followed by the matched positions provided that the trade satisfies the personalized filter requirements established by the user.

The municipal bond trading system of the present invention provides a new way for professional market participants to view and interpret real-time trade data. By integrating systems to associate real-time trade information with real-time offerings, bids, and bids wanted, users will have greater transparency and decision making capabilities than under the time intensive methods currently used.

Embodiments of the system according to the present invention may integrate a number of disparate components to deliver relevant information in a timely manner to traders. Real-time matching implemented by the present invention works advantageously with a commingled inventory of securities from a number of different entities, including alternative trading systems, exchanges, and broker's brokers. These types of entities aggregate content from broker dealers, mutual funds, insurance companies, bulletin board listing companies, and registered investment advisors.

For example, an ATS or broker's broker may facilitate anonymous trading between registered dealers by acting as a neutral intermediary; or, alternatively, they may facilitate trades between dealers and buy side firms by introducing the parties on a fully disclosed basis. In the latter case, issues of credit risk, suitability, conflicts of interest (e.g., where a party to a trade would be a buy-side firm that cannot trade directly with other buy-side firms) and the like are more easily addressed. The system and method according to the present invention provide for integrating the offers, bids, and bids wanted from a variety of such firms. Sophisticated firms and firms with a large number of offerings are likely to connect to the municipal bond trading system of the present invention through the use of direct connection, while less sophisticated firms and firms with smaller numbers of offerings may prefer to connect to the system via the internet.

While the invention has been particularly shown and described with reference to particular embodiments, those skilled in the art will understand that various changes in form and details may be made without departing from the spirit and scope of the invention as set forth in the appended claims. For example, references to the term "computer system" can be construed to include any arrangement of computing equipment components and links and respective allocation of functionality (including hardware, software and firmware) to the components, links for carrying out the present invention.

Storage media includes, without limitation, electronically readable storage media, which in turn encompass electromagnetic and optical storage media, as well as other data storage media compatible for use with computing equipment. Similarly, method steps may be construed to include substeps of greater or lesser number, or in an alternative arrangement, consistent with the present invention. The term real-time is used consistent with the scope of understanding in the field as to can encompass delays typically associated with the processing and transmission of data.

We claim:

1. A computer-implemented system for assisting in the trading of municipal bonds comprising:
   a central processor unit for receiving municipal bond trade data relating to municipal bond offers, bids, bids wanted and trades;
   a filter subsystem in communication with the central processor unit for defining a filter for a prospective trade of a municipal bond, the filter including event characteristics relevant to the municipal bond of the prospective trade; and
   an event subsystem in communication with the central processor unit for applying the filter to the received municipal bond trade data to identify events involving municipal bonds other than the municipal bond of the prospective trade and having the characteristics,
   wherein the identified events having the characteristics can be made available on an interface displaying real-time market content relevant to the prospective trade for use in the trading of municipal bonds.

2. The computer-implemented system of claim 1, wherein the filter subsystem and the event subsystem are implemented at least in part by the central processor unit.

3. The computer-implemented system of claim 1, wherein the filtering subsystem comprises filtering criterion associated with a user.

4. The computer-implemented system of claim 1, wherein the filter is configurable by a user.

5. The computer-implemented system of claim 1, wherein characteristics of events comprise:
   a price;
   a yield;
   a CUSIP;
   a state of issue; and
   a trade time.

6. The computer-implemented system of claim 5, wherein characteristics of events further comprise:
   a trade type identifier; and
   a trade date.

7. The computer-implemented system of claim 1, wherein the filter comprises:
   an event filter for determining whether a specific non-user event should be provided to the user; and
   a correlation filter for determining whether specific user events should be correlated with the specific non-user event.

8. The computer-implemented system of claim 7, wherein the event filter comprises the correlation filter.

9. The computer-implemented system of claim 1, wherein the filtering subsystem is implemented on a user's computer system.

10. The computer-implemented subsystem of claim 1, further comprising a market information subsystem in communication with the central processor unit for monitoring market data and generating events to be provided to the event subsystem.

11. The computer-implemented system of claim 1, further comprising a market information subsystem for providing market information or news related to the identified events having the characteristics.

12. The computer-implemented system of claim 1, further comprising a data communication server for providing event data to the central processing unit.

13. A computer-implemented system for providing data related to municipal bonds comprising:
   a data communication server for receiving data related to municipal bonds from at least one data or news provider;
   a central processing unit for receiving municipal bond data from the data communication server and for providing at least a portion of the received municipal bond data to a user, the central processing unit comprising:
      a filter subsystem for allowing a user to configure a filter to receive municipal bond data related only to a prospective trade of a municipal bond, the filter including event characteristics relevant to the municipal bond of the prospective trade; and
      an event subsystem for monitoring the municipal bond data received and applying the filter to the municipal bond data received to identify events involving municipal bonds other than the municipal bond of the prospective trade having the characteristics,
   wherein the central processing unit provides filtered municipal bond data to the user; and
   an interface for displaying real-time market content relevant to the municipal bond data.

14. The computer-implemented system of claim 13, wherein the at least one data or news provider comprises the MSRB.

15. The computer-implemented system of claim 13, wherein the filter subsystem receives at least one indicative of a municipal bond from a security master file for configuring the filter.

16. The computer-implemented system of claim 13, wherein the filtering subsystem is implemented on the user's computer system.

17. The computer-implemented system of claim 13, wherein the filter comprises:
   an event filter for determining whether a specific non-user event should be provided to the user; and
   a correlation filter for determining whether specific user events should be correlated with the specific non-user event.

18. The computer-implemented system of claim 17, wherein the event filter comprises the correlation filter.

19. The computer-implemented system of claim 13, further comprising a market information subsystem for providing market information or news related to the filtered data.

* * * * *